United States Patent [19]

Sugeno

[11] 3,731,701
[45] May 8, 1973

[54] SEPARATOR FOR FORCING FLUIDS BY PIPELINE
[75] Inventor: Koji Sugeno, Zama, Japan
[73] Assignee: Suzuei Co., Ltd., Tokyo, Japan
[22] Filed: July 2, 1971
[21] Appl. No.: 159,121

[30] Foreign Application Priority Data

July 25, 1970 Japan..................................45/64779

[52] U.S. Cl..............................137/268, 15/104.06 R
[51] Int. Cl. .................................................B08b 9/04
[58] Field of Search..............15/104.06 R, 104.06 A, 15/3.5, 3.51; 137/268, 802

[56] References Cited

UNITED STATES PATENTS

| 646,545 | 4/1900 | Novotny | 15/104.06 R |
| 3,041,204 | 6/1962 | Green | 15/104.06 R |
| 3,052,302 | 9/1962 | Lagucki | 15/104.06 R X |
| 3,600,736 | 8/1971 | Smith | 15/104.06 R |

*Primary Examiner*—Henry T. Klinksiek
*Assistant Examiner*—Robert J. Miller
*Attorney*—Woodhams, Blanchard & Flynn

[57] ABSTRACT

A separator for use in a pipe for separating different fluids within different axial sections of the pipe while enabling the different fluids to be simultaneously moved through the pipe. The separator includes a pair of substantially spherical hollow elastic bodies which are fixedly connected together by intermediate resiliently flexible wall means for permitting the bodies to deflect or bend relative to one another when passing through a curved pipe section. The spherical bodies each have an opening for providing communication between the pipe and the interior of the body whereby the fluid within the pipe deforms the elastic bodies into slideable sealing engagement with the internal wall of the pipe.

8 Claims, 5 Drawing Figures

Patented May 8, 1973 3,731,701
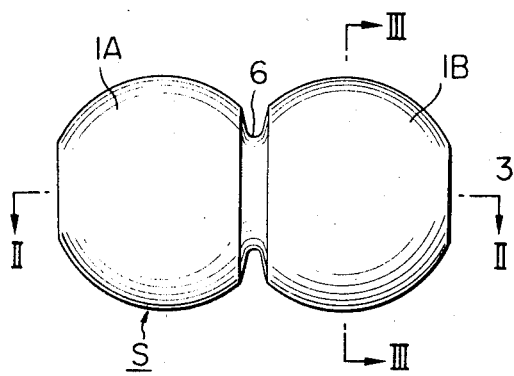
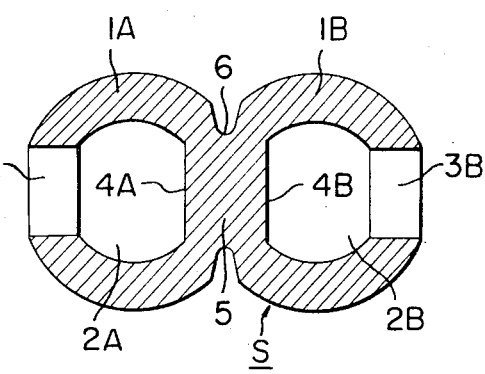
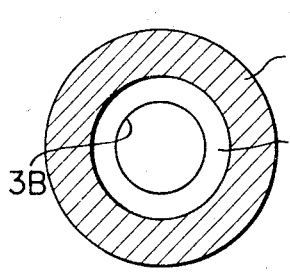
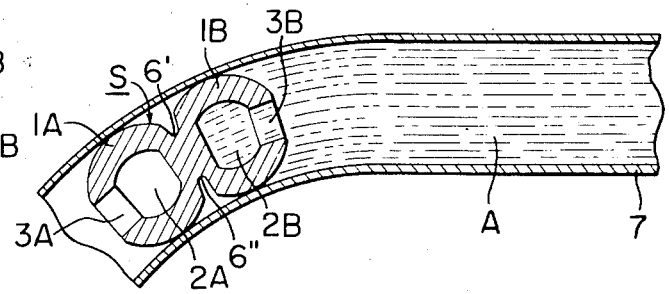
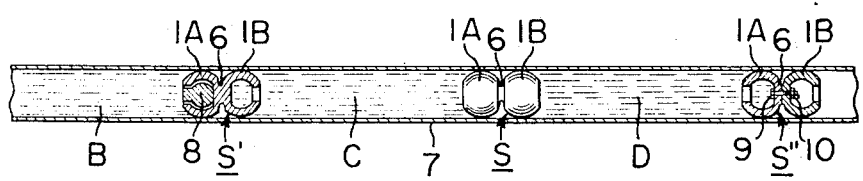
INVENTOR.
KOJI SUGENO
BY
Woodhams, Blanchard & Flynn
ATTORNEYS

SEPARATOR FOR FORCING FLUIDS BY PIPELINE

FIELD OF THE INVENTION

This invention relates to an improved separator for separating different fluids contained within different axial sections of a pipe, while the different fluids are moved along the pipe.

BACKGROUND OF THE INVENTION

Closed hollow spheres of oil- and wear-resistant synthetic rubber or other material have been commonly used for maintaining separated from one another, different fluids within different axial sections of a pipeline. The spheres permit the different fluids to be simultaneously movably forced through the pipe without substantial mixing of the fluids, because the separators move with the fluids as the different fluids flow through the pipeline. Such spherical separators are generally filled with water to expand same into slideable, substantial sealing engagement with the interior wall of the pipe. However, such spherical separators are not completely satisfactory because they are subject to breaking or leaking, whereupon the water inside the sphere is permitted to mix with the fluid being transported through the pipeline. Also, when the pipeline has bends or curves, as the spherical separator passes through the bent or curved portions of the pipeline, it often becomes spaced from the interior wall of the pipe at the bent section, thereby creatint a gap between the sphere and the interior wall of the pipe, which gap permits the different fluids on the opposite sides of the separator to come into contact with one another.

SUMMARY OF THE INVENTION

The present invention relates to an improved separator for overcoming the above-mentioned disadvantages. The separator, according to the invention, is characterized by a pair of bilateral hollow spherical portions having intermediate wall means therebetween, which wall means is of reduced cross section to permit relative flexing between the spherical portions, particularly when the spherical portions move through a curved or bent section of the pipe. Further, the spherical portions are constructed of elastic material and have openings formed therein for permitting each spherical portion to communicate with the adjacent fluid in the pipe, which fluid causes the elastic spherical portion to elastically deform into snug sliding but sealing engagement with the internal wall of the pipe.

BRIEF DESCRIPTION OF THE DRAWING

FIG. 1 is a front view of a separator constructed according to the present invention.

FIG. 2 is a cross sectional view of the separator taken along the line II—II of FIG. 1.

FIG. 3 is a cross sectional view taken along the line III—III of FIG. 1.

FIG. 4 is a fragmentary sectional view showing the separator inserted into a pipe for effecting separation of two different fluids flowing through the pipe.

FIG. 5 is a fragmentary sectional view showing a pipe having therein separators constructed according to the present invention, and additionally illustrating modifications of the separator constructed according to the present invention.

DETAILED DESCRIPTION

Referring to the drawings, and particularly FIGS. 1-3, there is illustrated a separator S constructed according to the present invention for effecting separation of different liquids within a single pipe and for permitting the separate liquids to be simultaneously movably forced or transported through the pipe. The separator S is made of an elastic material, which material has the required wear resistance and chemical resistance to the fluids being transported. A variety of suitable materials, such as various synthetic rubbers, are known for this purpose and they do not require detailed description.

The separator S includes a pair of adjacent, substantially spherical parts 1A and 1B which are substantially identical. The spherical parts 1A and 1B are substantially hollow and have interior chambers 2A and 2B, respectively, formed therein. The opposite ends of the spherical parts 1A and 1B respectively have openings 3A and 3B formed through the wall of the spherical parts for permitting communication with the chambers 2A and 2B respectively. The chambers 2A and 2B have closed inner walls 4A and 4B which define therebetween a common integral intermediate wall 5 which integrally and fixedly interconnects the spherical bodies 1A and 1B in a side-by-side relationship. The intermediate wall section 5 has an exterior annular groove 6 for creating a more pronounced separation between the parts 1A and 1B. The groove 6 results in the intermediate wall 5 having a reduced cross section, which thus permits relative angular or flexing movement between the parts 1A and 1B.

The elastic spherical parts 1A and 1B are so designed as to fill or totally occupy the inside diameter of a pipeline in which the separator is to be placed. Thus, the spherical parts 1A and 1B preferably have a maximum cross sectional diameter substantially equal to the inside diameter of the pipeline. This condition is illustrated in FIG. 4 wherein the separator S is disposed within a pipeline 7 having a bent section through which the separator must pass. As illustrated in FIG. 4, the pipeline 7 contains a first fluid A disposed in one axial section of the pipeline, which fluid is disposed in contact with the spherical part 1B. A further axial section of the pipeline (the section disposed leftwardly of the separator S) is filled with a different fluid, such as compressed air. The compressed air in the leftward section of pipeline 7 passes through opening 3A into chamber 2A, causing the elastic spherical part 1A to deform into tight sliding but sealing engagement with the internal wall of the pipeline 7. Similarly, the fluid A in the rightward section of pipeline 7 also passes through the opening 3B into chamber 2B to cause the elastic spherical part 1B to deform into tight sliding but sealing engagement with the internal wall of the pipeline 7. The spherical parts 1A and 1B thus create a double annular seal which effectively prevents the compressed air and the fluid A from intermixing as the fluid A and the separator S are forcibly moved (such as rightwardly in FIG. 4) through the pipeline 7. The separator S thus creates a double circular sealing contact with the pipeline to create an effective sliding sealing relationship but still permitting movability of the separator and the fluids.

Further, when the separator S moves through a curved portion of the pipeline 7, such as illustrated in FIG. 4, the separator S can move freely through the curved portion while at the same time maintaining its effective sealing relationship with the internal wall of the pipe so as to maintain the two fluids effective separated. This desirable relationship within the bent or curved portion of the pipeline is permitted due to the relative flexing or bending which occurs between the elastic spherical parts 1A and 1B. As the separator S moves through the curved pipe portion, the parts 1A and 1B bend or flex to a limited degree relative to one another and relative to the intermediate wall section 5. This flexing or pivoting of the parts 1A and 1B is made possible because of the annular groove 6, so that as the separator S moves through the curved pipe section, the upper portion of the groove 6' widens adjacent the outside radius of the pipe and the lower portion of the groove 6'' narrows adjacent the inside radius of the pipe, due to the relative pivoting between the parts 1A and 1B. This construction thus permits both the parts 1A and 1B to maintain a desired sealing engagement with the pipe, even when moving through a curved pipe section, thereby maintaining the two fluids axially separated or segregated.

FIG. 5 illustrates therein a further manner in which separators constructed according to the present invention can be utilized for transmitting a plurality of different fluids through a single pipeline. As illustrated in FIG. 5, the pipeline 7 contains therein a plurality of different fluids, such as the fluids B, C and D, which fluids are disposed in axially spaced portions of the single pipeline 7 and are maintained effectively axially separated from one another by means of intermediate separators, such as the separator S, S' and S''.

The separator S used to axially separate the fluids C and D is identical to the separator S illustrated in FIG. 4 and comprises a one-piece integral elastic body having two spherical parts, such as parts 1A and 1B. The separator S' illustrated in FIG. 5 is identical to the separator S as described above except that one of the spherical parts, such as the part 1A, has a filler member 8 loosely fitted within the hollow chamber so as to substantially totally occupy same. The filler member is disposed within the spherical part 1A to prevent the fluid from remaining behind.

The separator S'' illustrated in FIG. 5 is also substantially identical to the separator S except that, instead of being fabricated as an integral one-piece elastic body, such as is true of the separator S, the separator S'' utilizes separate elastic spherical parts 1A and 1B, which parts are substantially identical and have their bottom walls disposed in abutting relationship and fixedly interconnected by means of a nut 9 and a bolt 10. The separator S'' is thus identical to the separator S except that it is fabricated in two parts and is bolted together, rather than being fabricated as a one-piece elastic member.

The separator according to the present invention is thus used to permit transporting of several different kinds of fluids through a single pipeline and to minimize mixing of the fluids. Further, even at the curved portions of the pipeline, the separator can effectively separate the fluids which are disposed both ahead of and behind the separator, while at the same time the separator is smoothly movable through the pipeline and prevents the leakage or intermixing of the fluids due to the desirable elastic deformation of the separator into sealing engagement with the interior wall of the pipeline. Since the separator has a double, substantially circular sealing contact with the inner wall of the pipe, and since the separator additionally utilizes the fluid in the pipe to assist in deforming the spherical parts into sealing engagement with the internal walls of the pipeline, the separator can thus effect a desirable separation of the fluids.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A separator adapted to be movably disposed with a pipeline for axially separating different fluids which are being simultaneously moved through the pipe, said separator comprising a pair of adjacent substantially spherical parts constructed of an elastic material and secured together in side-by-side adjoining relationship, said parts each being substantially hollow to define an internal chamber therein, said chambers being open at their opposite ends and closed at their adjacent ends so that the respective fluids can enter the chambers to deform same into snug sliding and sealing contact with the internal wall of the pipe, the external walls of said parts defining an external annular groove at the juncture of said parts to permit flexing of said parts relative to each other.

2. A separator according to claim 1, wherein the openings are substantially coaxially aligned.

3. A separator according to claim 1, wherein said pair of spherical parts are separable, and including releasable fastening means fixedly connecting said parts.

4. A separator according to claim 1, wherein said spherical parts are secured together by integral intermediate wall means whereby said separator comprises a one-piece monolithic member.

5. A separator according to claim 1, wherein a filler member is loosely fitted within at least one of said chambers.

6. A separator according to claim 1 disposed within a pipe, wherein said spherical parts have a cross sectional diameter substantially equal to the internal diameter of the pipe, and wherein the fluids disposed within the pipe pass through the openings into the internal chambers for causing the elastic spherical parts to radially expand to create a tight sliding and sealing engagement with the internal walls of the pipe.

7. A separator according to claim 6, wherein said separator, creates two axially spaced, annular areas disposed in sealing and sliding engagement with the internal wall of said pipe.

8. A separator according to claim 1, wherein the separator, in longitudinal cross-section, has substantially the shape of a figure eight.

* * * * *